(12) United States Patent
Huang

(10) Patent No.: US 10,569,829 B1
(45) Date of Patent: Feb. 25, 2020

(54) DRIVETRAIN SYSTEM FOR BICYCLE AND CHAINRING INSTALLATION STRUCTURE THEREOF

(71) Applicant: TH Industries Co., Ltd, Taichung (TW)

(72) Inventor: Tzu-Tai Huang, Taichung (TW)

(73) Assignee: TH INDUSTRIES CO., LTD., Taichung (TW)

( * ) Notice: Subject to any disclaimer, the term of this patent is extended or adjusted under 35 U.S.C. 154(b) by 0 days.

(21) Appl. No.: 16/165,995

(22) Filed: Oct. 19, 2018

(51) Int. Cl.
*B62M 3/00* (2006.01)
*F16D 3/16* (2006.01)
*B62M 1/36* (2013.01)
*F16D 3/22* (2006.01)
*B62M 9/00* (2006.01)
*F16D 3/205* (2006.01)

(52) U.S. Cl.
CPC ............... *B62M 1/36* (2013.01); *B62M 9/00* (2013.01); *F16D 3/2057* (2013.01); *F16D 3/22* (2013.01)

(58) Field of Classification Search
CPC .......... B62M 1/36; B62M 1/38; B62M 3/003; B62M 3/06; B62M 9/00; B62M 9/04; B62M 9/06; B62M 9/08; B62M 9/12; B62M 9/121; B62M 9/124; B62M 25/06; F16D 3/2057; F16D 3/22
See application file for complete search history.

(56) References Cited

U.S. PATENT DOCUMENTS

| | | | |
|---|---|---|---|
| 6,173,982 B1 * | 1/2001 | Westergard | B62M 9/085 280/261 |
| 9,944,347 B2 * | 4/2018 | Cooke | B62M 1/36 |

* cited by examiner

*Primary Examiner* — Adam D Rogers
(74) *Attorney, Agent, or Firm* — R. Lynette Wylie; Apex Juris, PllC.

(57) ABSTRACT

A chainring installation structure includes a crank, a spindle, and a swing assembly. The spindle includes a first rotational axis, and one end of the spindle is connected to the crank. The crank drives the spindle to cause the spindle to rotate about the first rotational axis. The swing assembly is disposed at one end of the spindle adjacent to the crank without contacting the crank. The swing assembly can shift axially relative to the spindle. The swing assembly includes a second rotational axis that crosses the first rotational axis, in which the swing assembly can rotate about the second rotational axis.

18 Claims, 18 Drawing Sheets

DRIVETRAIN SYSTEM FOR BICYCLE AND CHAINRING INSTALLATION STRUCTURE THEREOF

FIELD OF THE INVENTION

The present disclosure relates to a bicycle, and more particularly to a drivetrain system for a bicycle and a chainring installation structure thereof.

BACKGROUND OF THE INVENTION

A multi-speed bicycle on the market is equipped with a drivetrain as shown in FIG. 1. Refer to FIG. 1, which is a schematic top view of a drivetrain 100 of a conventional multi-speed bicycle. The drivetrain 100 in FIG. 1 belongs to a 1X transmission system and includes a drive chain 110, a freewheel 120 and a chainwheel 130. The chainwheel 130 is a single chainring and is connected with a crank (not shown). The freewheel 120 has a plurality of sprockets 121 stacked on each other and is connected to a rearwheel (not shown).

The sizes of the sprockets 121 are different from each other. As seen in FIG. 1, the sprockets 121 are arranged from top to bottom in an order from large to small, so the uppermost sprocket 121 in FIG. 1 has the largest diameter, whereas the lowermost sprocket 121 in FIG. 1 has the smallest diameter. The drive chain 110 engages with the freewheel 120 and the chainwheel 130 and has flexibility, so that the drive chain 110 can be bent in the direction of a rotational axis A12 of the freewheel 120 and a rotational axis A13 of the chainwheel 130. Thus, the drive chain 110 can be selectively engaged with one of the sprockets 121 to achieve a multi-speed function.

However, the drive chain 110 is bent in the directions of both the rotational axis A12 and the rotational axis A13 so as to generate a lateral stress which can causes friction between the drive chain 110 and both of the freewheel 120 and the chain wheel 130. The greater magnitude of the drive chain 110 is bent (in the direction of the rotation axes A12 and A13), the greater the lateral stress would be, so that the greater friction could be generated. Once the friction is greater than a certain degree, not only a louder noise is generated when riding the bicycle, but also the drive chain 110, the freewheel 120, and the chainwheel 130 would be worn out quickly. Even the risk of disengagement of the drive chains 110 with the freewheel 120 or the chainwheel 130 may be increased.

The section of BACKGROUND OF THE INVENTION is used merely to aid in the understanding of the present disclosure, and what is disclosed in BACKGROUND OF THE INVENTION may include some of the conventional techniques that are not known to those of ordinary skill in the art. Moreover, what is disclosed in BACKGROUND OF THE INVENTION does not imply that the content or the problem to be solved by one or more embodiments of the present disclosure and does not mean that it has been known to those of ordinary skill in the art before the application of the present disclosure.

SUMMARY OF THE INVENTION

The present disclosure provides a chainring installation structure that utilizes an axial shift generated between a swing assembly and a spindle to reduce the abovementioned friction.

A chainring installation structure provided by the present disclosure includes a crank, a spindle, and a swing assembly. The spindle includes a first rotational axis, and one end of the spindle is connected to the crank. The crank drives the spindle to cause the spindle to rotate about the first rotational axis. The swing assembly is disposed at one end of the spindle adjacent to the crank without contacting the crank. The swing assembly shifts axially relative to the spindle. The swing assembly includes a second rotational axis and rotates about the second rotational axis, wherein the second rotational axis crosses the first rotational axis.

A drivetrain system provided by the present disclosure includes a crank, a spindle, a swing assembly, a freewheel, and a drivetrain element. The spindle includes a first rotational axis, and one end of the spindle is connected to the crank. The crank drives the spindle to rotate about the first rotational axis. The swing assembly is disposed at one end of the spindle adjacent to the crank without contacting the crank to cause the swing assembly to shift axially relative to the spindle. The swing assembly includes a chainwheel and a second rotational axis, wherein the second rotational axis crosses the first rotational axis. The freewheel includes a third rotational axis, and the drivetrain element is engaged with the chainwheel and the freewheel, wherein the first rotational axis and the third rotational axis are in a coplane, and an included angle is formed between the second rotational axis and the coplane.

Based on the above, since the swing assembly can rotate about the second rotational axis, the swing assembly can shift axially relative to the spindle. In this way, it can help reduce lateral stress and reduce friction, thereby reducing the noise generated during riding and the wear of the drivetrain element.

BRIEF DESCRIPTION OF THE DRAWINGS

The present disclosure will become more readily apparent to those ordinarily skilled in the art after reviewing the following detailed description and accompanying drawings, in which.

DETAILED DESCRIPTION OF EMBODIMENTS

Figure 1:
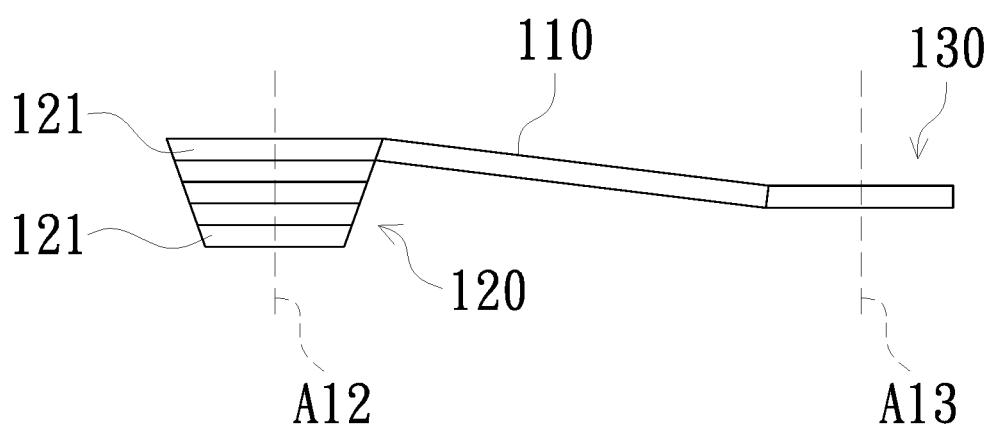
FIG. 1 is a top view of a drivetrain system of a conventional multi-speed bicycle.

In the following, the present disclosure will be described in detail by various embodiments of the present disclosure in conjunction with the accompanying drawings. However, the concepts of the present disclosure may be embodied in many different forms and should not be construed as being limited to the illustrative embodiments set forth herein. In addition, the same reference numerals in the drawings can be used to represent similar elements.

Figure 2A:
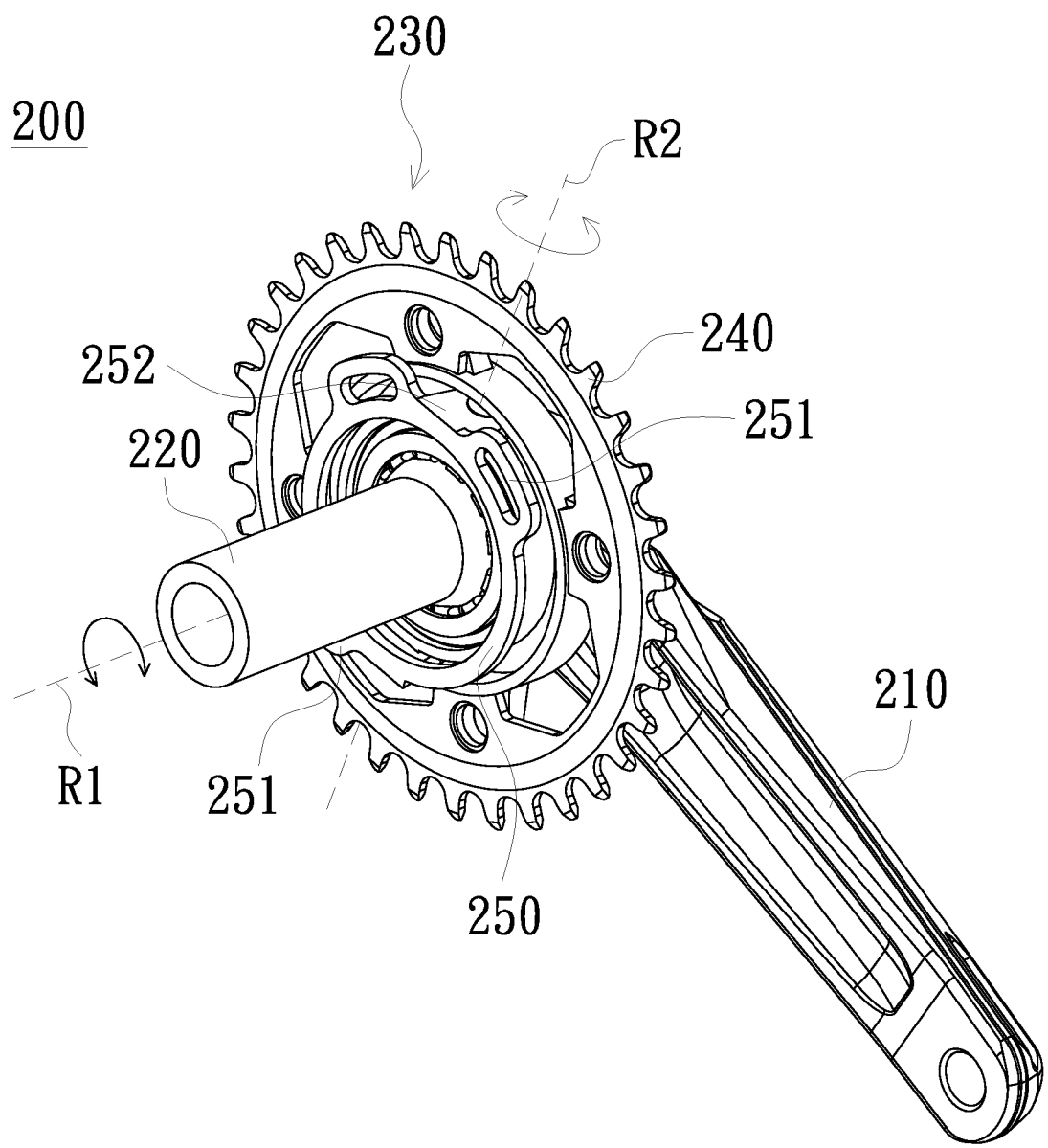
FIG. 2A is a perspective view of a chainring installation structure according to one embodiment of the present disclosure.
Figure 2B:
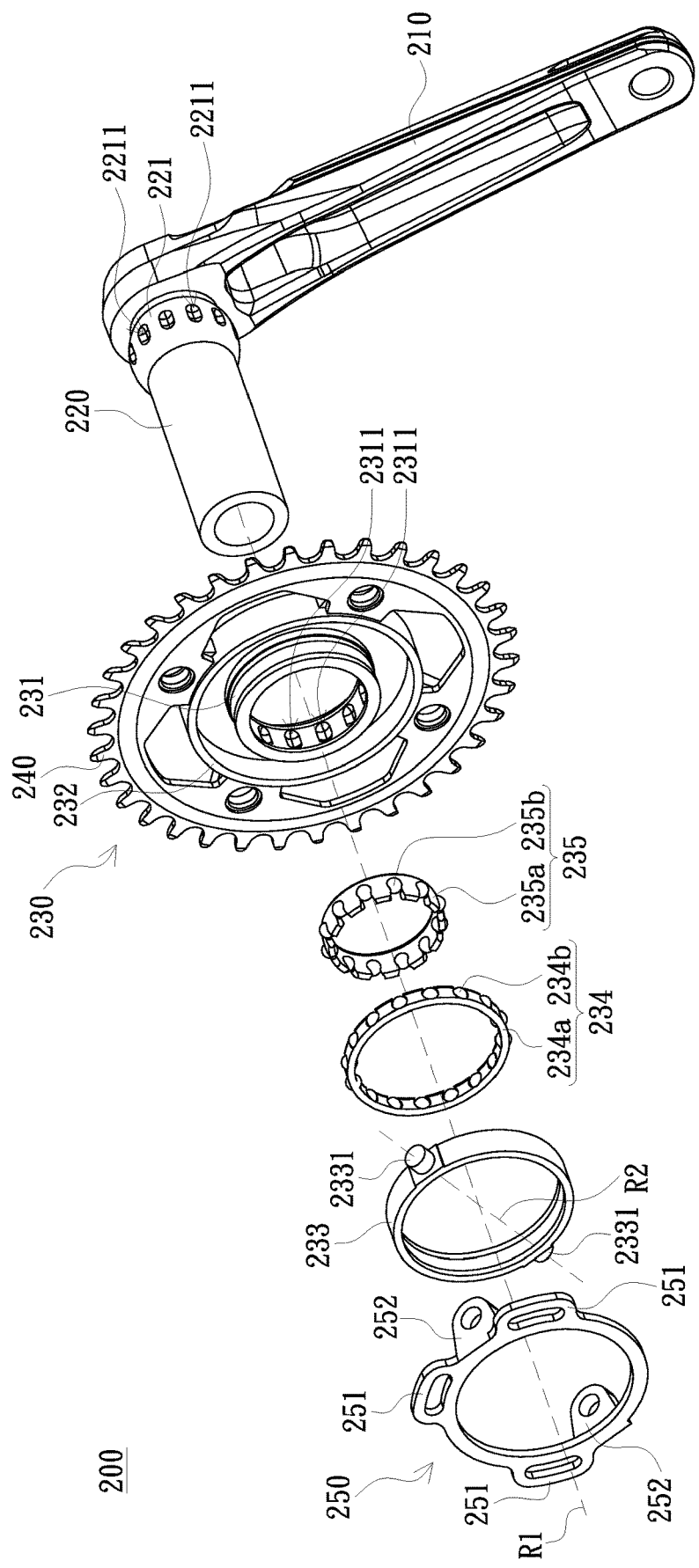
FIG. 2B is a perspective exploded view of the chainring installation structure of FIG. 2A.

FIG. 2A is a perspective view of a chainring installation structure according to one embodiment of the present disclosure, and FIG. 2B is a perspective exploded view of the chainring installation structure of FIG. 2A. Referring to FIGS. 2A and 2B, a chainring installation structure 200 includes a crank 210 and a spindle 220. The spindle 220 includes a first rotational axis R1 that is substantially the same as an axis of the spindle 220, and one end of the spindle 220 is connected to the crank 210. When the crank 210 rotates along the first rotational axis R1, the crank 210 can drive the spindle 220 to cause the spindle 220 to rotate about the first rotational axis R1.

The chainring installation structure 200 further includes a swing assembly 230, and the swing assembly 230 is disposed at one end of the spindle 220 near the crank 210, wherein the swing assembly 230 is not in contact with the crank 210 and is movably disposed on the spindle 220. That is, the swing assembly 230 can be moved relative to the spindle 220. The swing assembly 230 includes a second rotational axis R2 and rotates about the second rotational axis R2 to enable the swing assembly 230 to shift relative to the spindle 220, wherein the second rotational axis R2 crosses the first rotational axis R1, that is, the second rotational axis R2 intersects the first rotational axis R1. The swing assembly 230 is connected to a chainring 240, the chainring 240 can be a chainwheel of a bicycle and is capable of engaging a drivetrain element such as a chain or a belt.

When the crank 210 rotates along the first rotational axis R1, the spindle 220 rotates along and drives the swing assembly 230 to cause the swing assembly 230 to rotate about the first rotational axis R1. The rotating swing assembly 230 can drive the chainring 240 to rotate, and the rotating chainring 240 can drive the drivetrain element (such as a chain) and transmit power to a freewheel of the bicycle using the drivetrain element to move the bicycle. Since the swing assembly 230 can rotate about the second rotational axis R2, during riding the bicycle and changing gears, the swing assembly 230 can be driven by the drivetrain element to shift relative to the spindle 220 to reduce a friction between both of the freewheel and the chainring 240 and the drivetrain element, and to reduce the noise generated during riding and the wear of the drivetrain element and the chainring 240.

The swing assembly 230 further includes a fixing bracket 250, and the fixing bracket 250 can be secured to a bicycle frame to enable the chainring installation structure 200 to be mounted on the bicycle. In the embodiment shown in FIGS. 2A and 2B, at least one installation portion 251 extending radially is disposed on an outer periphery of the fixing bracket 250. Using FIGS. 2A and 2B as an example, the fixing bracket 250 has three installation portions 251, but the quantity of the installation portions 251 disclosed in FIGS. 2A and 2B is not limited to this embodiment. The installation portions 251 each have an opening (not labeled) for screw insertion so that the installation portions 251 can be locked to the bicycle frame. In other words, in the embodiment shown in FIGS. 2A and 2B, the fixing bracket 250 is secured to the bicycle frame by means of locking. However, in other embodiments, the fixing bracket 250 can be secured to the bicycle frame by other means, such as welding or riveting. Therefore, the fixing means between the fixing bracket 250 and the bicycle frame is not limited to the locking means.

Figure 2C:
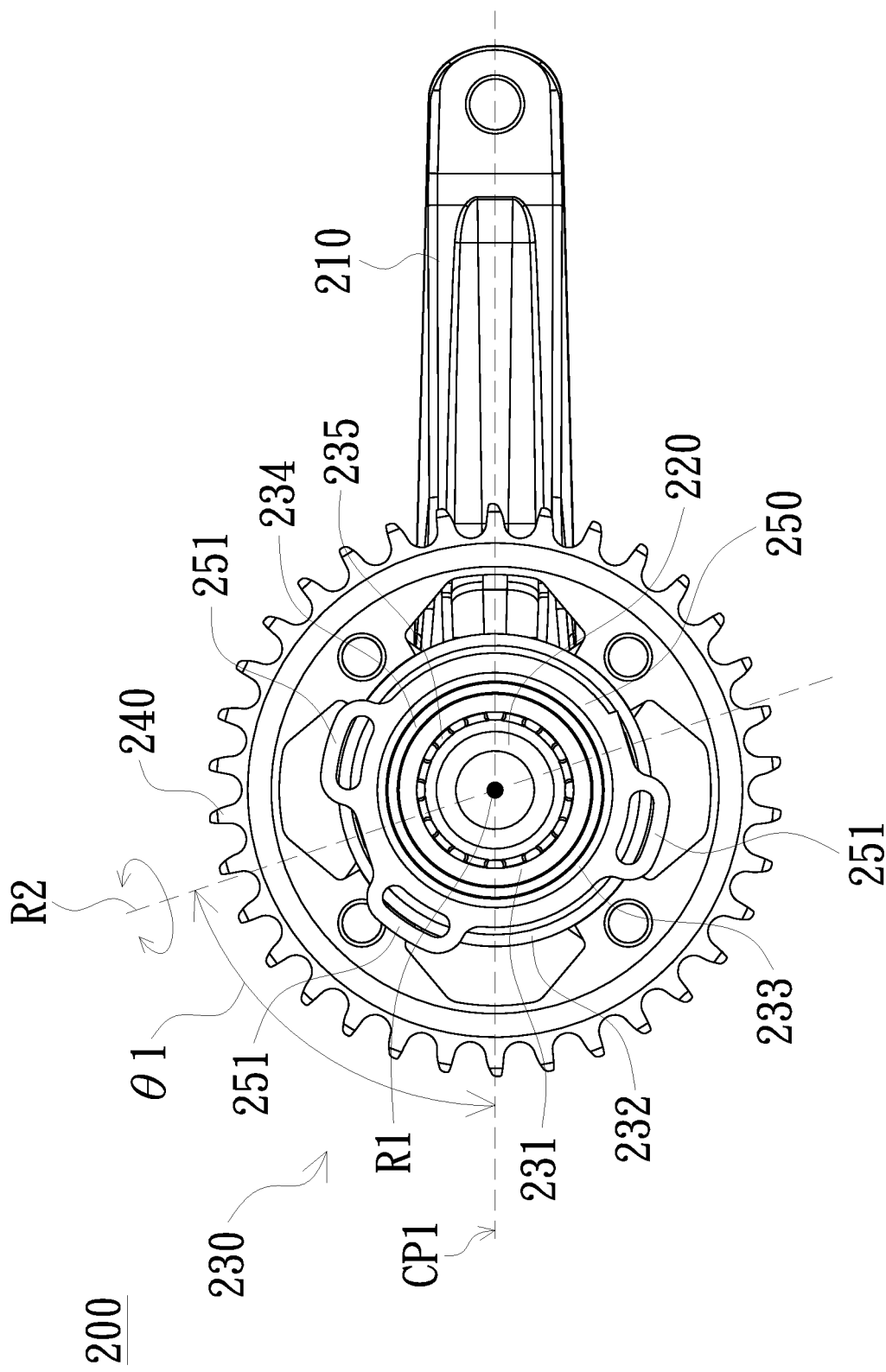
FIG. 2C is a side view of the chainring installation structure of FIG. 2A.

FIG. 2C is a side view of the chainring installation structure of FIG. 2A. Referring to FIGS. 2B and 2C, the swing assembly 230 further includes a first sleeve 231, a second sleeve 232, and a third sleeve 233. The first sleeve 231, the second sleeve 232, and the third sleeve 233 are approximately concentrically arranged with each other, wherein the third sleeve 233 is concentrically disposed between the first sleeve 231 and the second sleeve 232. In detail, a radial outer periphery of the first sleeve 231 is connected to a radial inner periphery of the third sleeve 233, and a radial inner periphery of the first sleeve 231 is disposed on the spindle 220. Thus, the first sleeve 231 surrounds the spindle 220 and is located between the spindle 220 and the third sleeve 233. A radial outer periphery of the second sleeve 232 is connected to the chainring 240, and a radial inner periphery of the second sleeve 232 is connected to a radial outer periphery of the third sleeve 233. Thus, the second sleeve 232 surrounds the third sleeve 233.

The third sleeve 233 can be pivotally connected to the fixing bracket 250. Specifically, the third sleeve 233 includes two pivotal portions 2331, and two connecting portions 252 extending in an axial direction are disposed on the outer periphery of the fixing bracket 250. Each of the pivotal portions 2331 can be a stud, and each of the connecting portions 252 can have an opening, wherein the pivotal portions 2331 can respectively pass through the openings of the connecting portions 252, so that the two connecting portions 252 are disposed on the two pivotal portions 2331 of the third sleeve 233. In addition, the two pivotal portions 2331 are disposed on the outer periphery of the third sleeve 233 under point symmetry. Thus, the second rotational axis R2 passes through an axis of the third sleeve 233 to cause the swing assembly 230 to be able to rotate about the second rotational axis R2 relative to the fixing bracket 250.

The swing assembly 230 can further include an intermediate element 234, which can be a bearing, as shown in FIG. 2B. In the embodiment illustrated in FIG. 2B, the intermediate element 234 includes an assembly ring 234a and a plurality of balls 234b, wherein the balls 234b are mounted on the assembly ring 234a. The intermediate element 234 is concentrically disposed between the first sleeve 231 and the third sleeve 233, and the balls 234b are in contact with the radial outer periphery of the first sleeve 231 and the radial inner periphery of the third sleeve 233. When the first sleeve 231 rotates, although the third sleeve 233 does not rotate along with the first sleeve 231 because the third sleeve is connected to the fixing bracket 250, and the intermediate element 234 enables the first sleeve 231 to rotate relative to the third sleeve 233, so that the rotation of the first sleeve 231 would not be interfered by the third sleeve 233.

The intermediate element 234 can also limit the relative displacement between the first sleeve 231 and the third sleeve 233 to stabilize the first sleeve 231 in rotation, thereby preventing the first sleeve 231 from being detached from the third sleeve 233. Furthermore, the first rotational axis R1 can lie in a plane CP1, which can be a horizontal plane. An included angle θ1, which is an acute angle, is between the second rotational axis R2 and the plane CP1. Thus, the first rotational axis R1 is obviously not perpendicular to the plane CP1 (horizontal plane), wherein the included angle θ1 can be greater than 30 degrees and less than 90 degrees.

The swing assembly 230 can further include a sliding element 235, wherein the sliding element 235 is mounted between the spindle 220 and the first sleeve 231. The sliding element 235 can include a position limiting ring 235a and a plurality of balls 235b, wherein the position limiting ring 235a can have a plurality of openings (not labeled), and the balls 235b can be respectively disposed in the openings of the position limiting ring 235a. Moreover, in the present embodiment, the balls 235b are disposed in grooves of both the spindle 220 and the first sleeve 231, respectively, so that the balls 235b can be limited between the spindle 220 and the first sleeve 231.

In detail, the spindle 220 has a flange portion 221 on an outer periphery adjacent to the crank 210, and the flange portion 221 has a plurality of first guiding grooves 2211, and the inner periphery of the first sleeve 231 has a plurality of second guiding grooves 2311, wherein the first guiding grooves 2211 and the second guiding grooves 2311 can be paralleled to the first rotational axis R1 (as shown in FIG. 2B), so the extending directions of both the first guiding grooves 2211 and the corresponding second guiding grooves 2311 can be the same. The balls 235b of the sliding element 235 are correspondingly mounted between the first guiding grooves 2211 and the second guiding grooves 2311, so that the balls 235b are limited by the first guiding grooves 2211, the second guiding grooves 2311 and the position limiting ring 235a and are difficult to be detached from the spindle 220 and the first sleeve 231.

Figure 2D:
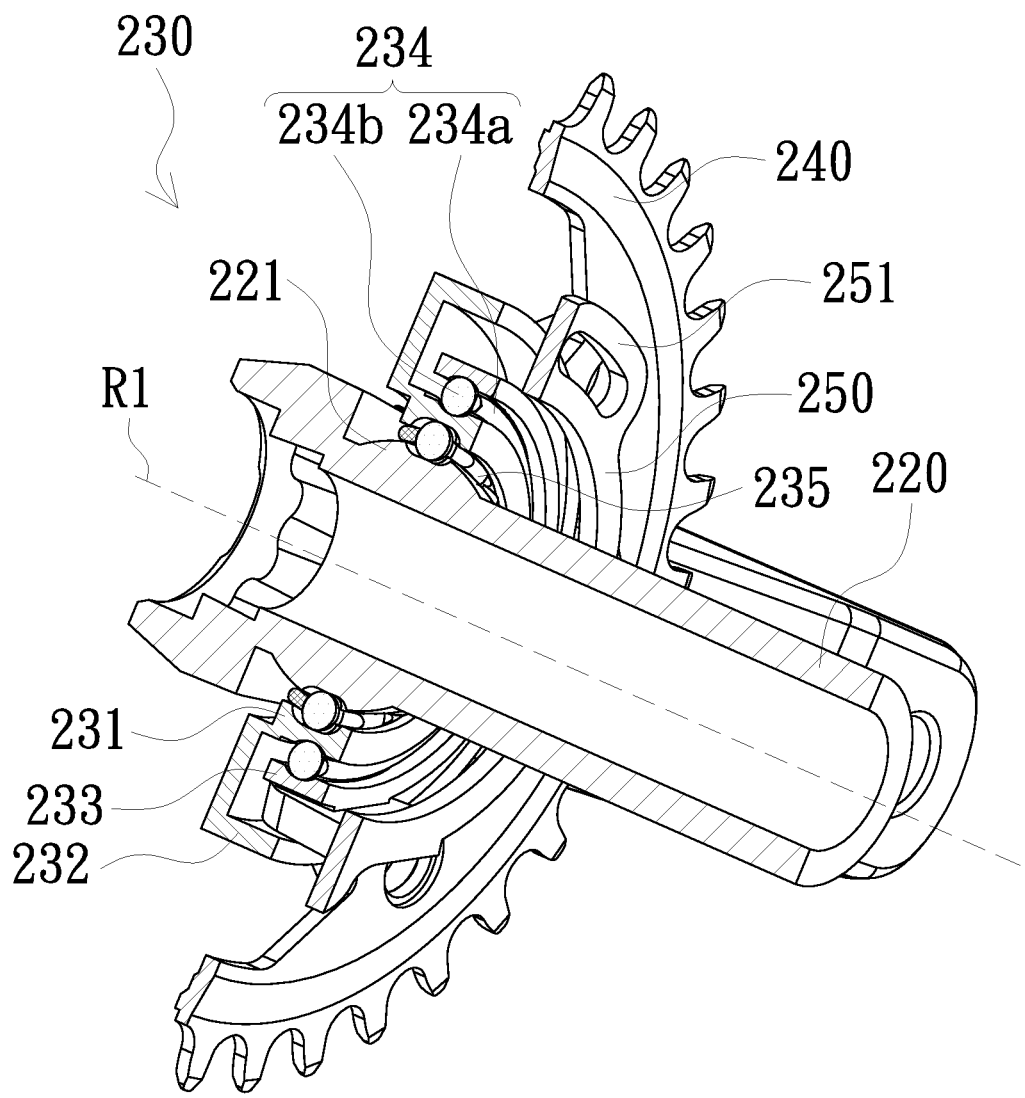
FIG. 2D is a cross-sectional perspective view of the chainring installation structure of FIG. 2A.

FIG. 2D is a cross-sectional perspective view of the chainring installation structure of FIG. 2A, wherein FIG. 2D is cross-sectional perspective view along the plane CP1 of FIG. 2C. Referring to FIGS. 2B and 2D, the first sleeve 231 can be moved relative to the spindle 220 by using the balls 235b of the sliding element 235 to cause the swing assembly 230 to move axially relative to the spindle 220. Therefore, the swing assembly 230 can be slightly moved relative to the spindle 220 along the first rotational axis R1 to reduce the friction between the drivetrain element and both the freewheel and the chainring 240, thereby effectively reducing noise and wear.

In addition, the balls 234b located between the first guiding grooves 2211 and the second guiding grooves 2311 can transmit power to enable the spindle 220 to drive the first sleeve 231. In detail, when the spindle 220 rotates along the first rotational axis R1, the balls 235b located between the first guiding grooves 2211 and the second guiding grooves 2311 can also rotate along with the spindle 220 around the first rotational axis R1, and the rotating balls 235b can drive the first sleeve 231 so that the first sleeve 231 can also rotate along with the spindle 220 along the first rotational axis R1. Thus, the spindle 220 rotating along the first rotational axis R1 can drive the swing assembly 230 so that the swing assembly 230 can rotate about the first rotational axis R1.

It should be explained that, in the embodiment shown in FIG. 2B, the sliding element 235 includes the position limiting ring 235a. In other embodiments, even if the sliding element 235 does not include the position limiting ring 235a, the first guiding grooves 2211 and the second guiding grooves 2311 also have a function of limiting the balls 235b, so that the balls 235b are not easily detached from the spindle 220 and the first sleeve 231, and the balls 235b can also transmit power, so that the swing assembly 230 can be driven by the spindle 220 to rotate along the first rotational axis R1. Therefore, the sliding element 235 may not include the position limiting ring 235a, that is, the sliding element 235 is not limited to include the position limiting ring 235a necessarily.

Figure 2E:
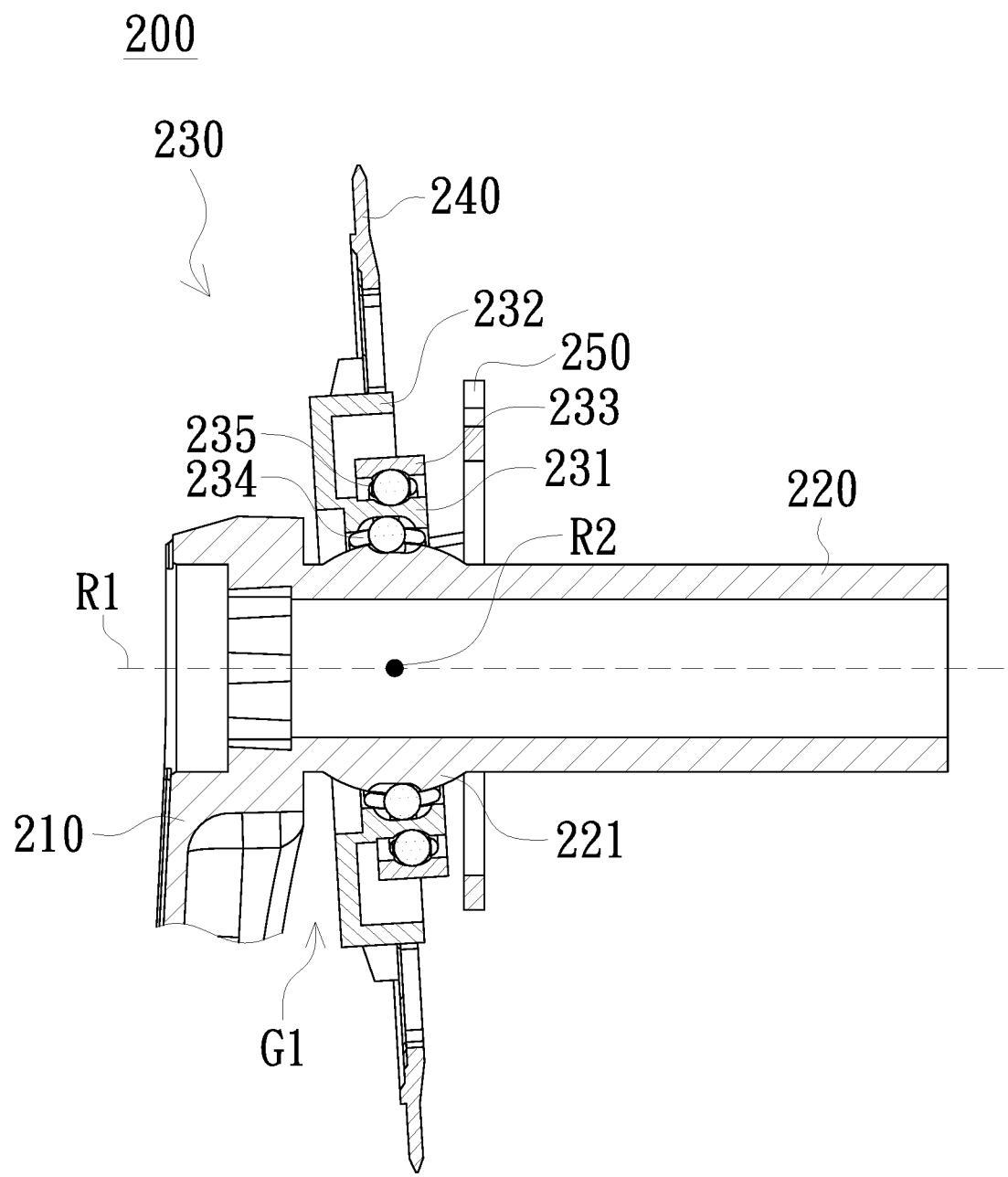
FIGS. 2E and 2F are cross-sectional views of FIG. 2C.
Figure 2F:
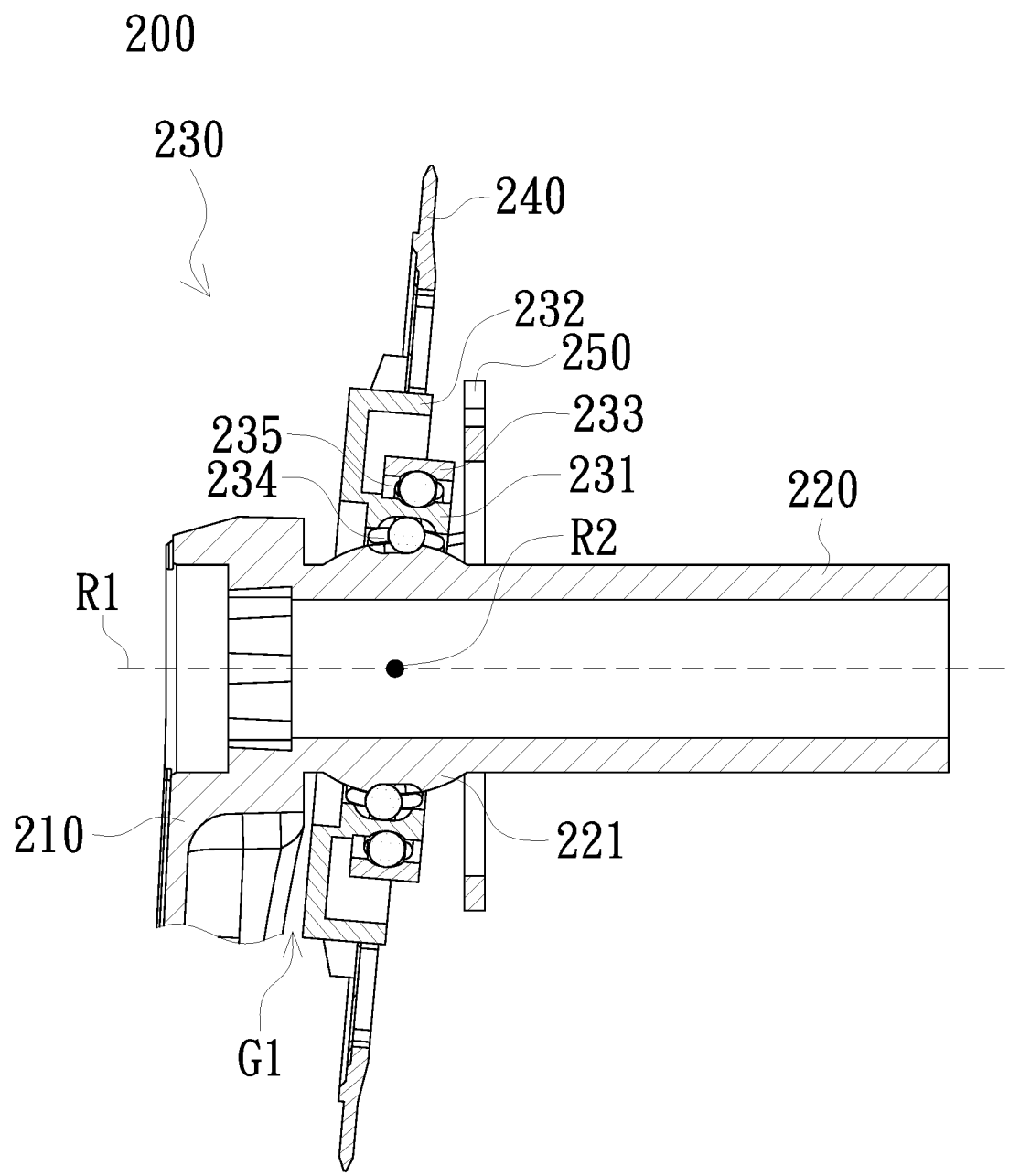

FIGS. 2E and 2F are cross-sectional views of FIG. 2C, wherein FIGS. 2E and 2F are both sectionally drawn along a plane 2E of FIG. 2C. Referring to FIG. 2B, FIG. 2E and FIG. 2F, the swing assembly 230 can rotate about the second rotational axis R2 relative to the fixing bracket 250, and the swing assembly 230 does not contact the crank 210. Thus, a gap G1 is formed between the swing assembly 230 and the crank 210, as shown in FIGS. 2E and 2F. Therefore, the rotating of the swing assembly 230 relative to the fixing bracket 250 is not interfered by the crank 210. Furthermore, the intermediate element 234 can prevent the rotation of the first sleeve 231 from being interfered by the third sleeve 233. When riding the bicycle and changing gears, the swing assembly 230 can swing along the second rotational axis R2, so that the chainring 240 can be driven by the drivetrain element (such as a chain) to shift axially relative to the spindle 220 to reduce the friction between both the freewheel and the chainring 240 and the drivetrain element, thereby reducing the noise generated during riding and the wear of the drivetrain element.

Figure 3:
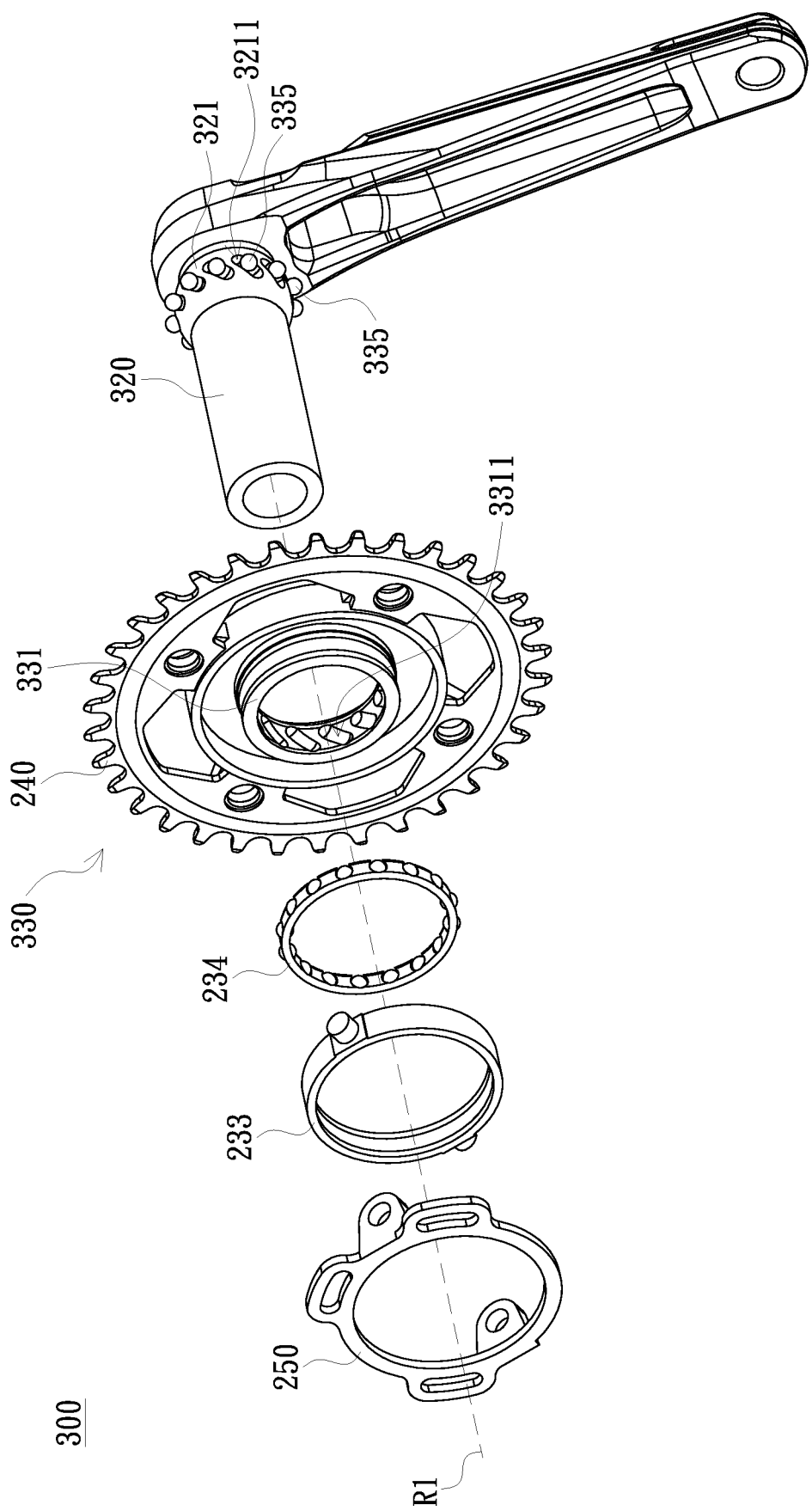
FIG. 3 is a perspective exploded view of a chainring installation structure according to another embodiment of the present disclosure.

FIG. 3 is a perspective exploded view of a chainring installation structure according to another embodiment of the present disclosure. Referring to FIG. 3, a chainring installation structure 300 is similar to the chainring installation structure 200 of the previous embodiment. For example, both also include the same components and also have the same efficacy. The differences between the chainring installation structures 300 and 200 will be mainly described below, and the same technical features will not be repeatedly described.

The chainring installation structure 300 includes a spindle 320 and a swing assembly 330. An outer periphery of the spindle 320 has a flange portion 321, and the flange portion 321 has a plurality of first guiding grooves 3211. The swing assembly 330 includes a first sleeve 331. Corresponding to the first guiding grooves 3211, an inner periphery of the first sleeve 331 has a plurality of second guiding grooves 3311. The extending directions of each of the first guiding grooves 3211 and the corresponding second guiding grooves 3311 can be the same. However, different from the first guiding grooves 2211 and the second guiding grooves 2311 in FIG. 2B, as it can be clearly seen from FIG. 3, the first guiding grooves 3211 and the second guiding grooves 3311 are not parallel to the first rotational axis R1. In addition, the swing assembly 330 of FIG. 3 further includes a sliding element that is also mounted between the spindle 320 and the first sleeve 331, wherein the sliding element includes a plurality of balls 335. However, unlike the sliding element 235 of FIG. 2B, the sliding element of FIG. 3 includes the balls 335 only, and does not include the other components, such as the position limiting ring 235a of FIG. 2B.

Figure 4A:
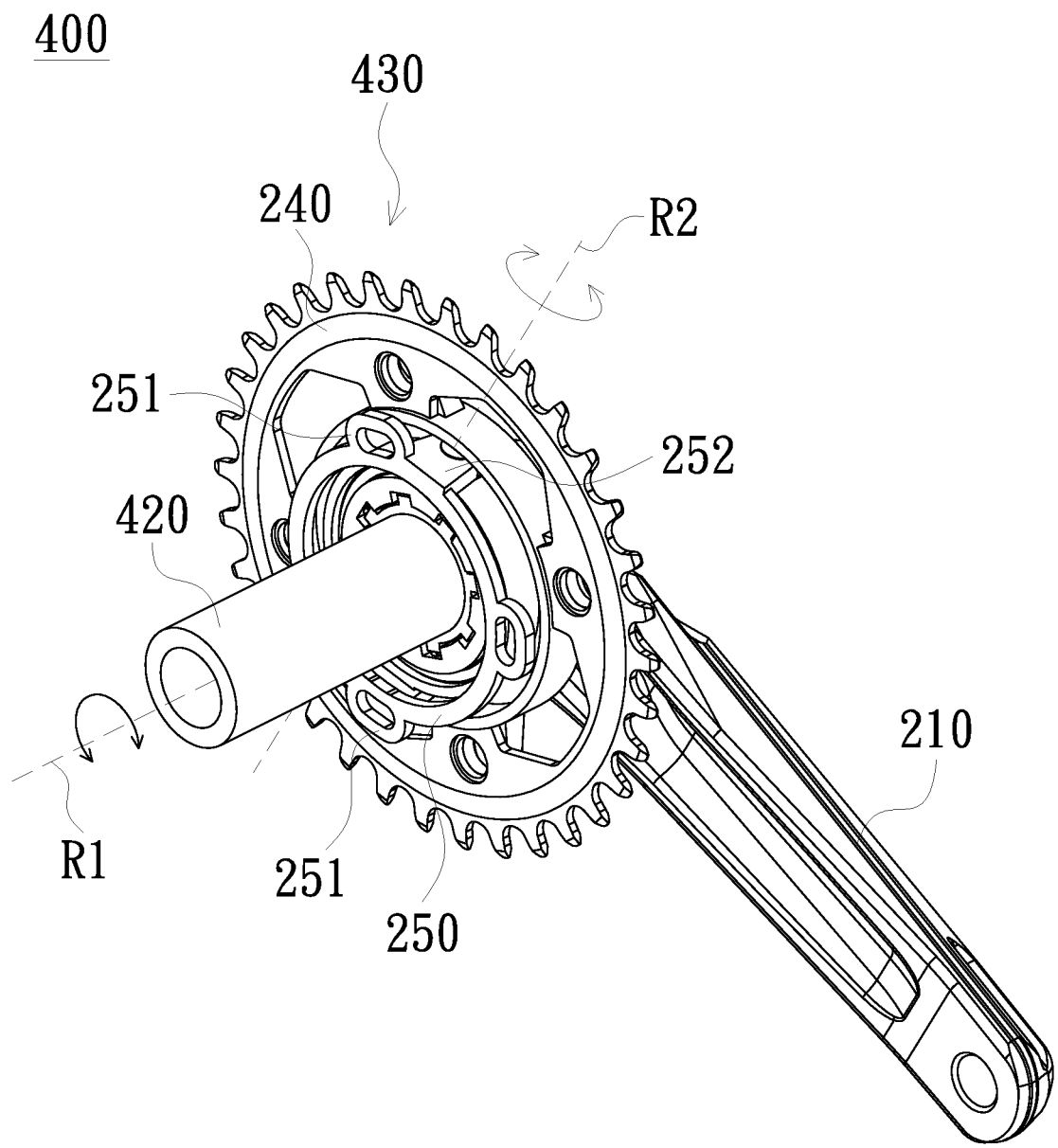
FIG. 4A is a perspective view of a chainring installation structure according to another embodiment of the present disclosure.
Figure 4B:
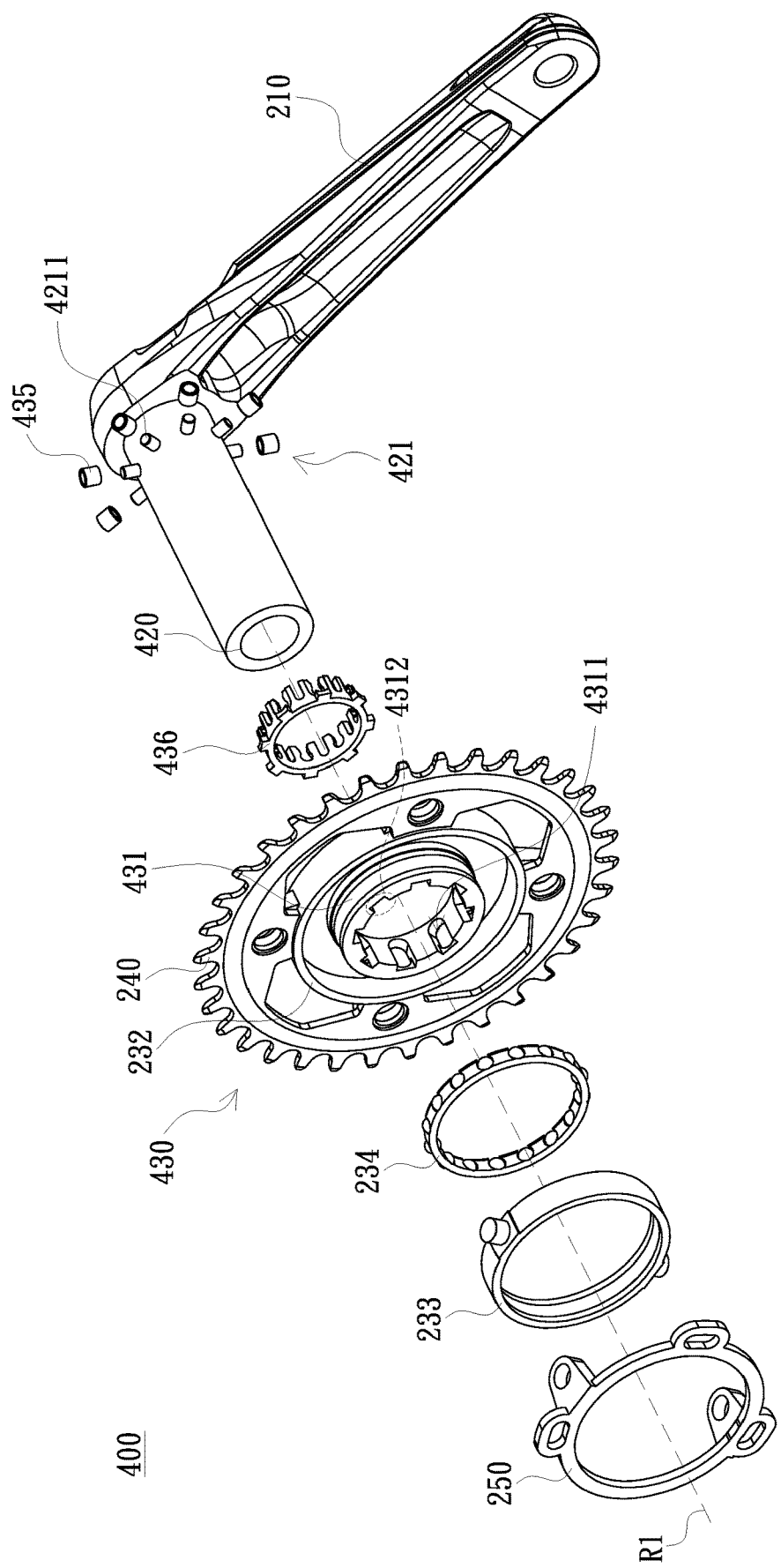
FIG. 4B is a perspective exploded view of the chainring installation structure of FIG. 4A.

FIG. 4A is a perspective view of a chainring installation structure according to another embodiment of the present disclosure, and FIG. 4B is a perspective exploded view of the chainring installation structure of FIG. 4A. Referring to FIGS. 4A and 4B, a chainring installation structure 400 of the present embodiment is similar to the chainring installation structure 200 of the previous embodiment. For example, the chainring installation structure 400 also includes a spindle 420 and a swing assembly 430, wherein the spindle 420 can rotate about the first rotational axis R1, and the swing assembly 430 also includes the fixing bracket 250 and the third sleeve 233. The fixing bracket 250 is pivotally connected to the third sleeve 233 so that the swing assembly 430 can swing about the second rotational axis R2 relative to the spindle 420, wherein the second rotational axis R2 crosses the first rotational axis R1. However, unlike the chainring installation structure 200 of the previous embodiment, the spindle 420 has a rib portion 421 adjacent to the crank 210, and the rib portion 421 includes a plurality of ribs 4211 radially arranged along an outer periphery of the spindle 420. Using FIG. 4B as an example, the ribs 4211 are arranged in a radial pattern and extend radially outward from the outer periphery of the spindle 420.

Figure 4C:
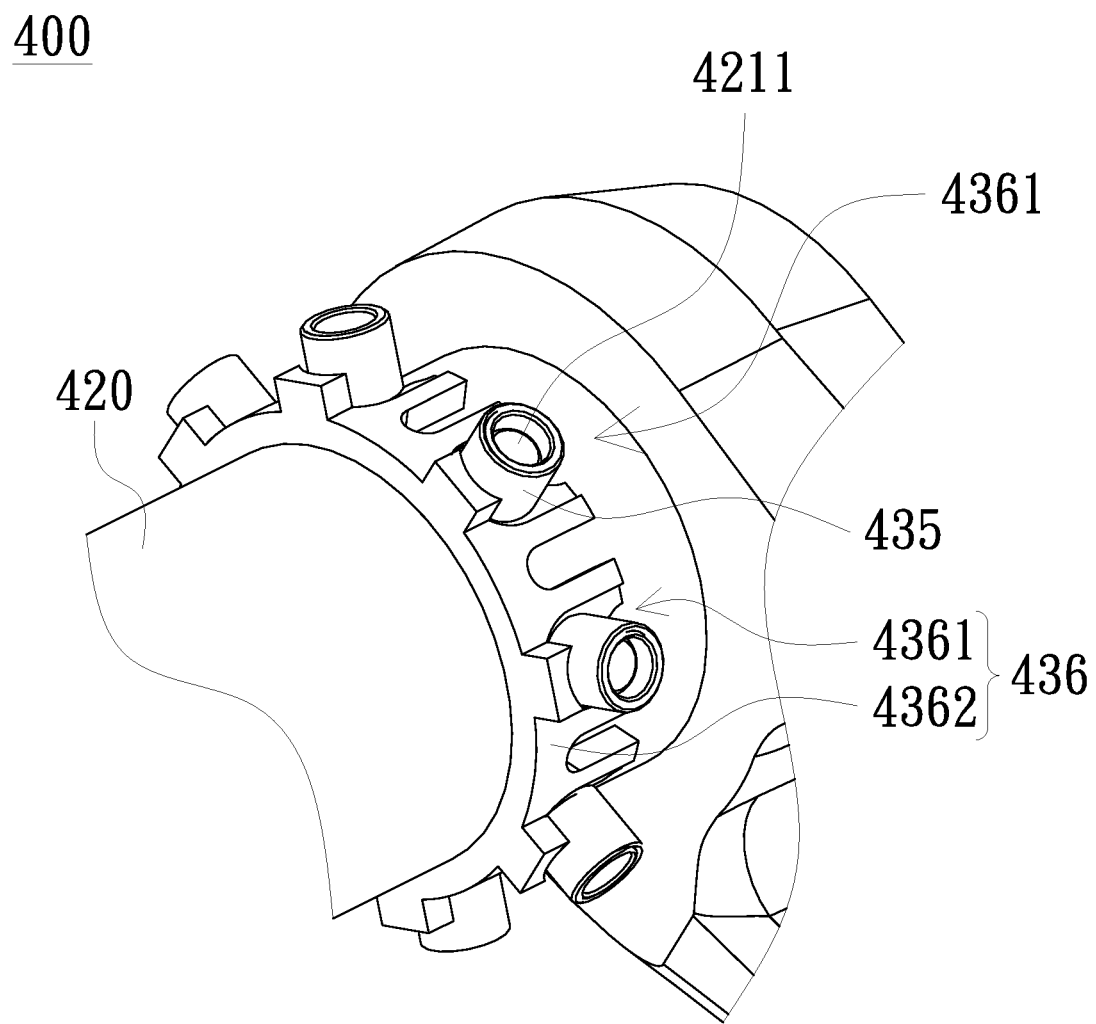
FIG. 4C is a partially enlarged view of a rib portion of the chainring installation structure of FIG. 4B.

FIG. 4C is a partially enlarged view of the rib portion of the chainring installation structure of FIG. 4B. Referring to FIGS. 4B and 4C, the swing assembly 430 includes a plurality of sliding elements 435, and the sliding elements 435 are correspondingly mounted on the ribs 4211. The sliding element 435 can be a roller, and thus the sliding element 435 has a hollow cylindrical shape, and the sliding element 435 has a through hole (not labeled). The sliding elements 435 are correspondingly mounted on the ribs 4211, that is, the through holes of the sliding elements 435 are respectively inserted with the ribs 4211, so that the sliding element 435 can spin relative to the rib 4211.

The swing assembly 430 further includes a first sleeve 431, and an inner periphery of the first sleeve 431 has a plurality of first guiding grooves 4311, wherein the ribs 4211 and the sliding elements 435 are correspondingly disposed in the first guiding grooves 4311. Since the sliding element 435 can spin relative to the rib 4211, the ribs 4211 and the sliding elements 435 disposed in the first guiding grooves 4311 can cause the swing assembly 430 to move axially relative to the spindle 420, thereby facilitating the swing assembly 430 to shift relative to the spindle 420.

Figure 4D:
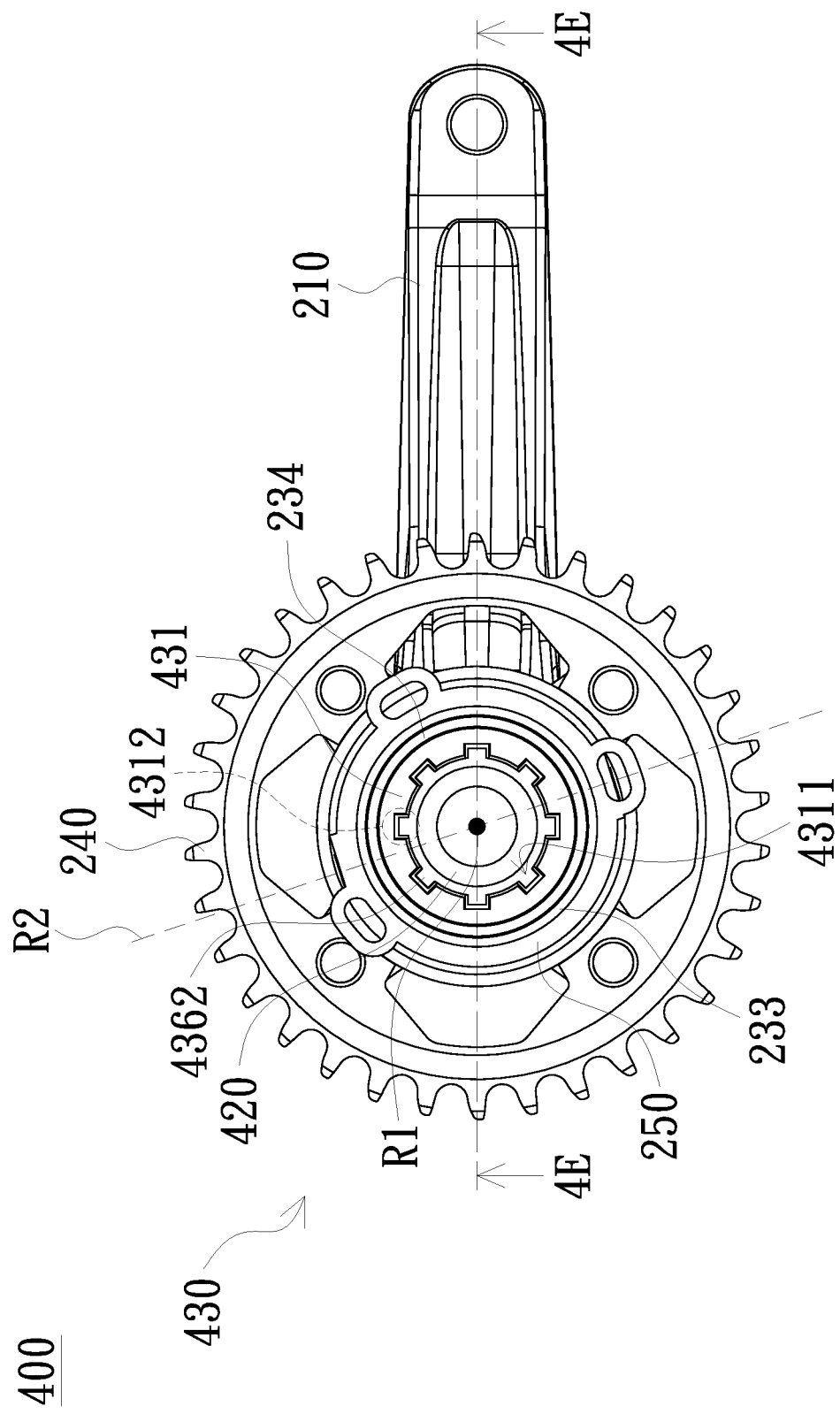
FIG. 4D is a side view of the chainring installation structure of FIG. 4A.

FIG. 4D is a side view of the chainring installation structure of FIG. 4A. Referring to FIG. 4B to FIG. 4D, different from the second guiding grooves 2311 in FIG. 2B, each of the first guiding grooves 4311 in FIG. 4B has a notch 4312, wherein the notches 4312 can be formed on a same side of the first sleeve 431 so that the rib portion 421 and the sliding elements 435 are fitted into the first guiding grooves 4311 from the notches 4312. Moreover, in the embodiment illustrated in FIGS. 4B and 4C, the spindle 420 and crank 210 can be two separate components.

The swing assembly 430 further includes a position limiting ring 436 concentrically disposed between the first sleeve 431 and the rib portion 421, wherein a configuration of the position limiting ring 436 fits the first sleeve 431 and the rib portion 421 to cause the swing assembly 430 to move axially restrictively relative to the spindle 420. Specifically, the position limiting ring 436 can include a plurality of second guiding grooves 4361 and a stop portion 4362, wherein the ribs 4211 and the sliding elements 435 are correspondingly disposed in the second guiding grooves 4361, that is, the ribs 4211 and the sliding elements 435 are located in the second guiding grooves 4361 respectively.

Each of the second guiding grooves 4361 can have an opening. Thus, the ribs 4211 can pass through the position limiting ring 436 from the second guiding grooves 4361, respectively.

The stop portion 4362 is basically annular in shape, and the second guiding grooves 4361 extend axially from one side of the stop portion 4362 toward the crank 210. After the position limiting ring 436 is disposed between the first sleeve 431 and the rib portion 421, a configuration of the stop portion 4362 fits the first guiding grooves 4311 of the first sleeve 431. Using FIGS. 4B and 4C as an example, the stop portion 4362 has a plurality of protrusions (not labeled) radially arranged along an outer periphery of the position limiting ring 436, wherein a shape of the protrusion fits a shape of the notch 4312, so that the protrusions are filled in the notches 4312 respectively. Thus, the configuration of the stop portion 4362 can fit the first guide grooves 4311 of the first sleeve 431.

Figure 4E:
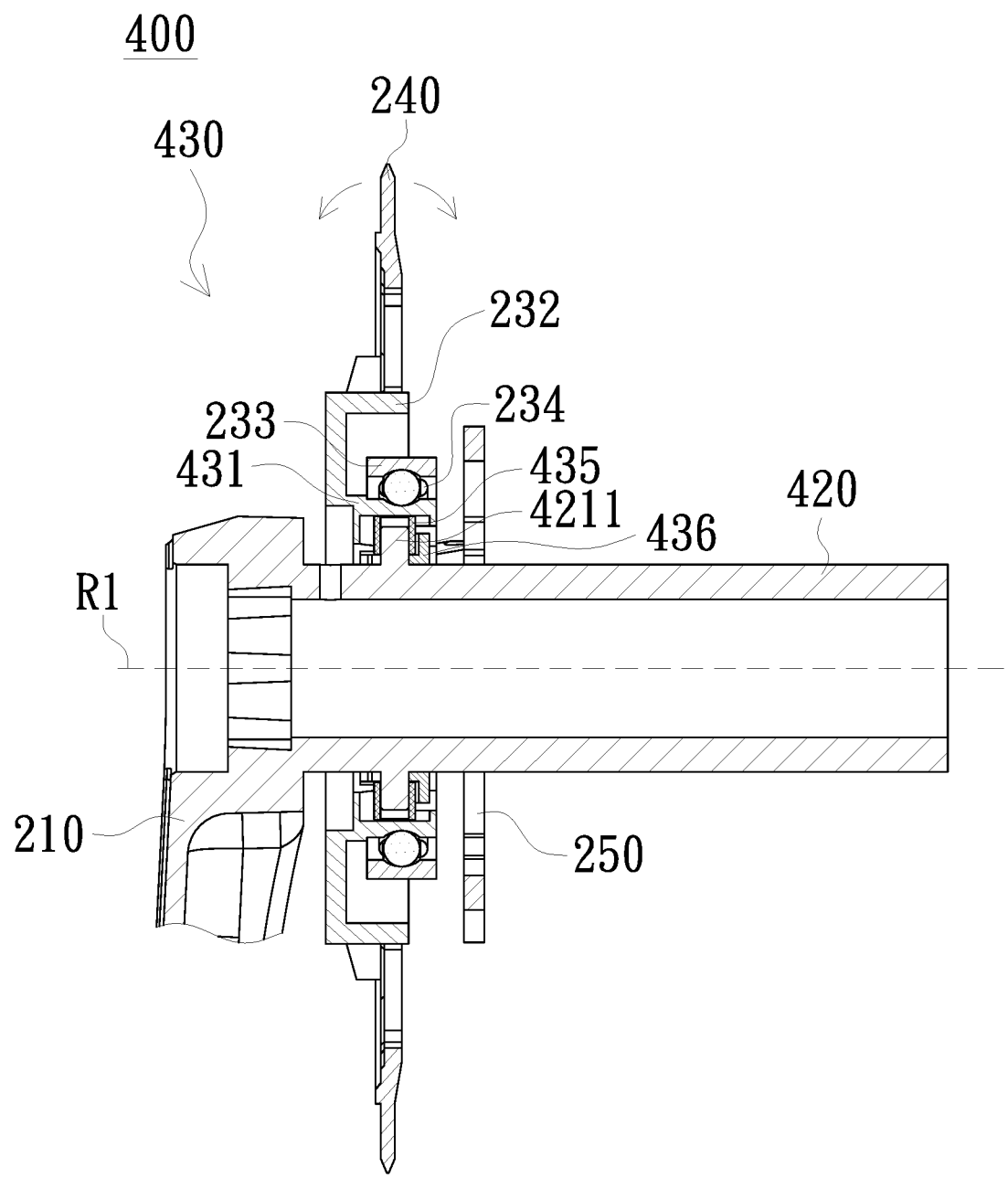
FIG. 4E is a cross-sectional view taken along line 4E-4E of FIG. 4D.

FIG. 4E is a cross-sectional view taken along line 4E-4E of FIG. 4D. Referring to FIG. 4D and FIG. 4E, in the chainring installation structure 400, since the ribs 4211 are respectively disposed in the first guiding grooves 4311, the ribs 4211 can also transmit power to enable the spindle 420 to drive the first sleeve 431. When the spindle 420 is rotated along the first rotational axis R1, the ribs 4211 and the sliding elements 435 can also rotate along with the spindle 420 around the first rotational axis R1. Therefore, the ribs 4211 can drive the first sleeve 431 so that the first sleeve 431 can also rotate along the first rotational axis R1 along with the spindle 420. Thus, the spindle 420 rotating along the first rotational axis R1 can cause the swing assembly 430 to rotate about the first rotational axis R1.

The swing assembly 430 can also rotate about the second rotational axis R2 relative to the fixing bracket 250, wherein the swing assembly 430 is also not in contact with the crank 210. Therefore, the crank 210 basically does not interfere with the relative rotating between the swing assembly 430 and the fixing bracket 250. Secondly, the ribs 4211 and the sliding elements 435 can cause the swing assembly 430 to move axially relative to the spindle 420. Moreover, the chainring installation structure 400 also includes the intermediate element 234 that can prevent the rotation of the first sleeve 431 from being interfered by the third sleeve 233, so that the spindle 420 can smoothly drive the first sleeve 431 to rotate. Thus, when riding the bicycle and changing gears, the swing assembly 430 can swing along the second rotational axis R2, so that the chainring 240 can be driven by the drivetrain element (e.g., a chain) to shift axially relative to the spindle 420 to reduce the friction between both the freewheel and the chainring 240 and the drivetrain element.

Figure 5A:
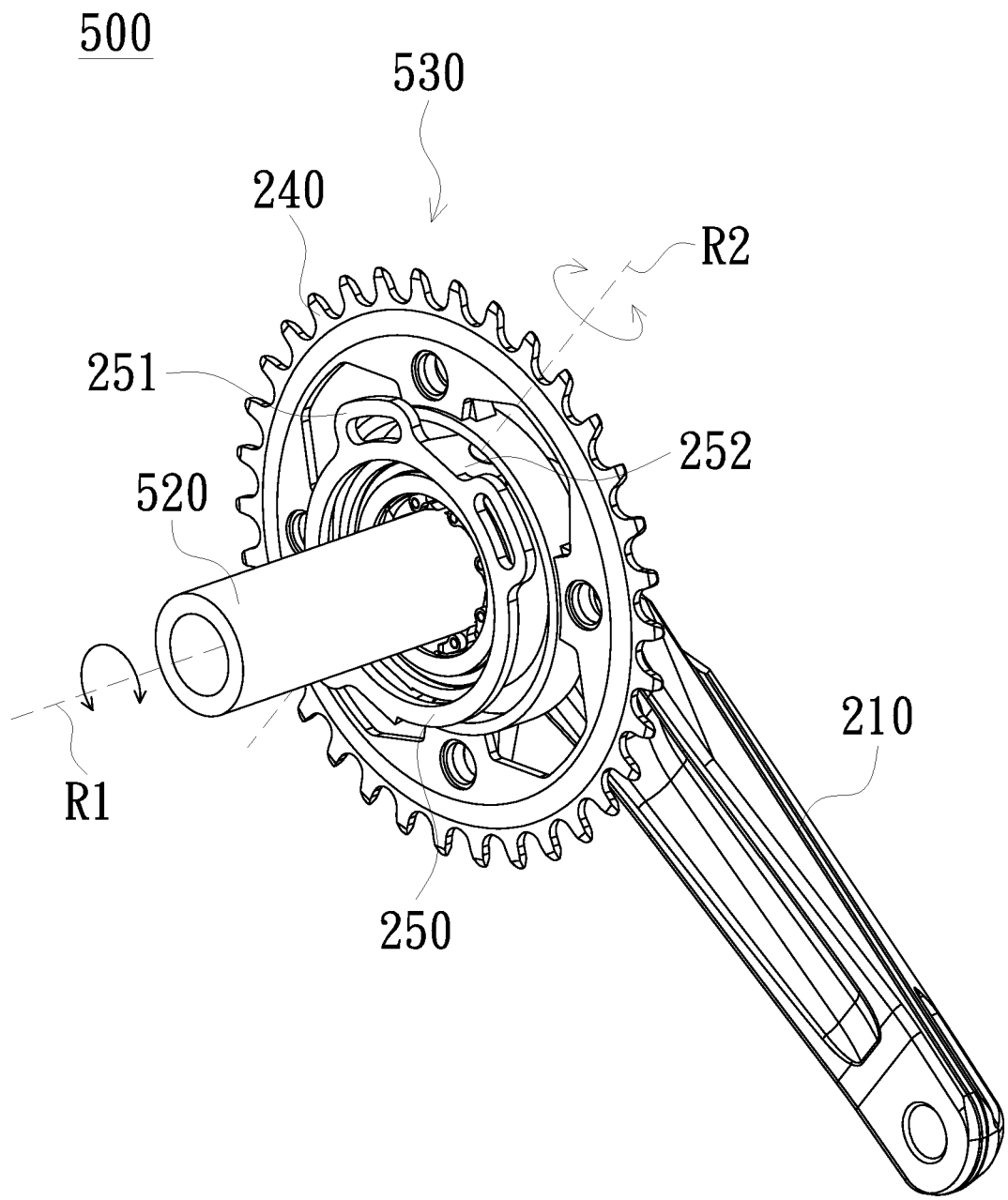
FIG. 5A is a perspective view of a chainring installation structure according to another embodiment of the present disclosure.
Figure 5B:
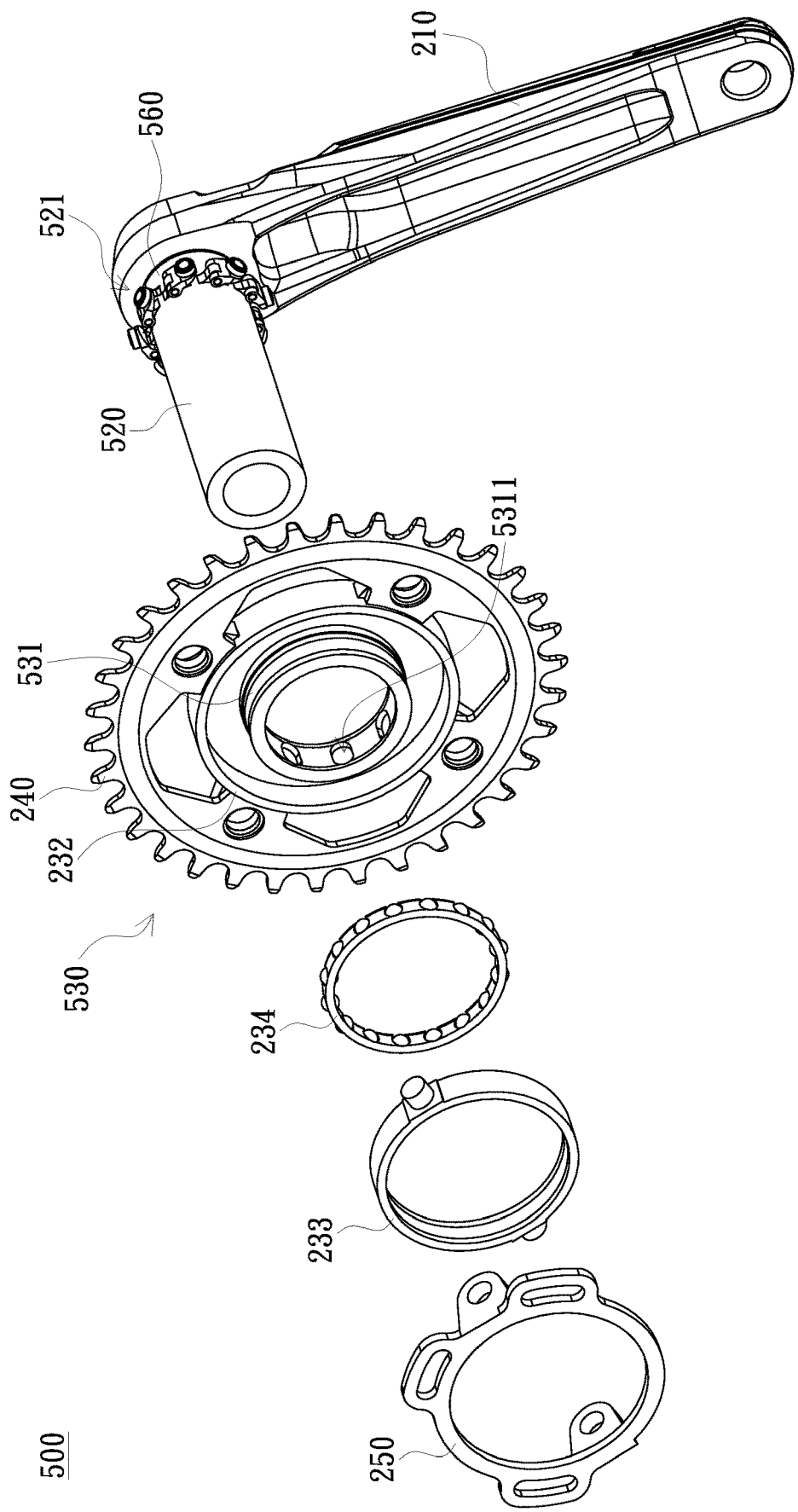
FIG. 5B is a perspective exploded view of the chainring installation structure of FIG. 5A.

FIG. 5A is a perspective view of a chainring installation structure according to another embodiment of the present disclosure, and FIG. 5B is a perspective exploded view of the chainring installation structure of FIG. 5A. Referring to FIGS. 5A and 5B, a chainring installation structure 500 of the present embodiment is similar to the chainring installation structure 400 of the previous embodiment. For example, the chainring installation structures 500 and 400 include the same components, and both have the same efficacy. However, the main differences between the two lie in, a structure of a spindle 520 included in the chainring installation structure 500 is different from a structure of the spindle 420 in the previous embodiment. The differences between the chainring installation structures 500 and 400 will be mainly described below, and the same technical features will not be repeatedly described.

The chainring installation structure 500 includes a swing assembly 530, and the swing assembly 530 includes a first sleeve 531, wherein an inner periphery of the first sleeve 531 has a plurality of guiding grooves 5311. In the chainring installation structure 500, the spindle 520 has a pawl portion 521 at a position adjacent to the crank 210, and the pawl portion 521 is disposed in the guiding grooves 5311, thus the first sleeve 531 surrounds the pawl portion 521. The pawl portion 521 enables the swing assembly 530 to move axially relative to the spindle 520, thereby facilitating the swing assembly 530 to shift relative to the spindle 520.

Figure 5C:
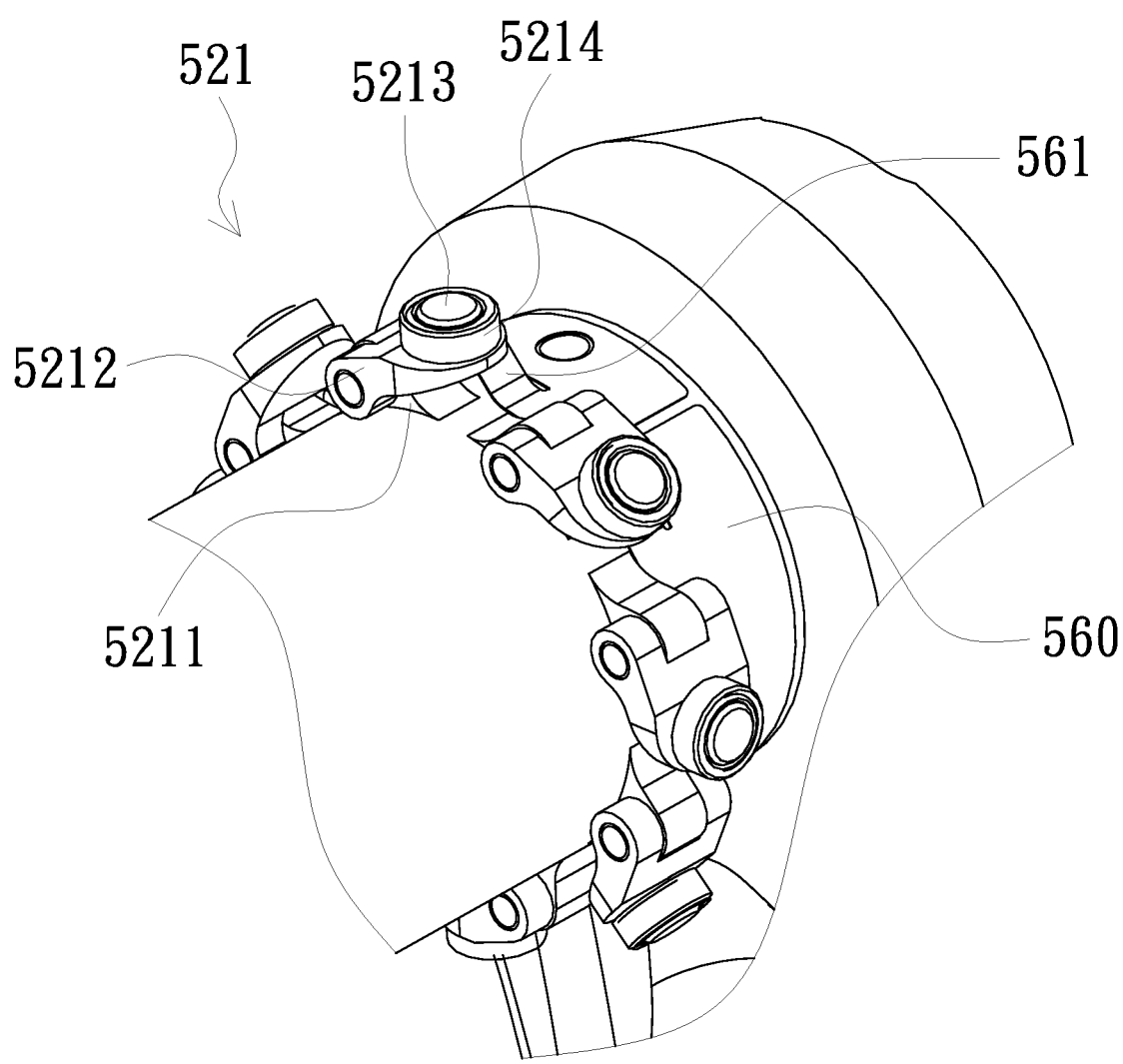
FIG. 5C is a partially enlarged view of a pivotal portion of the chainring installation structure of FIG. 5B.
Figure 5D:
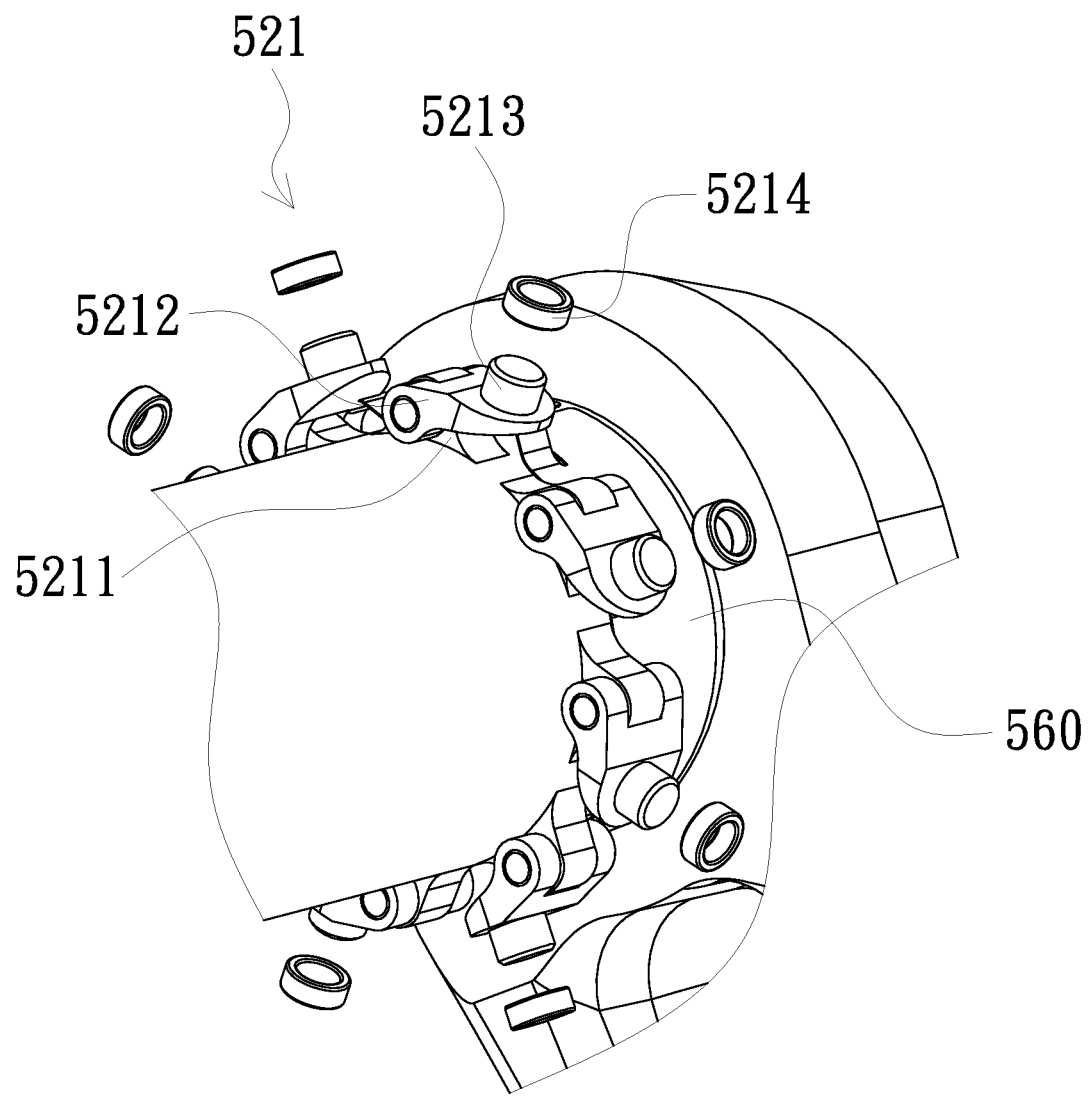
FIG. 5D is a perspective exploded view of the pivotal portion of the chainring installation structure of FIG. 5C.

FIG. 5C is a partially enlarged view of the pivotal portion of the chainring installation structure of FIG. 5B, and FIG. 5D is perspective exploded view of the pivotal portion of the chainring installation structure of FIG. 5C. Referring to FIG. 5C and FIG. 5D, in the embodiment shown in FIGS. 5C and 5D, the pawl portion 521 can include a plurality of bases 5211 and a plurality of pawls 5212 radially arranged along an outer periphery of the spindle 520, wherein the pawls 5212 are correspondingly pivotally connected to the bases 5211. Each of the pawls 5212 has a rib 5213, wherein the rib 5123 is located at a top end of the pawl 5212 as shown in FIG. 5C. The pawl portion 521 can further include a plurality of sliding elements 5214, such as a roller. The sliding elements 5214 are correspondingly mounted on the ribs 5213 so that the sliding elements 5214 can spin relative to the ribs 5213.

The ribs 5213 and the sliding elements 5214 are correspondingly mounted between the guiding grooves 5311 so that the pawl portion 521 can be disposed in the guiding grooves 5311. Since the sliding element 5214 can spin relative to the rib 5213, the ribs 5213 and the sliding elements 5214 mounted in the guiding grooves 5311 enable the swing assembly 530 to move axially relative to the spindle 520, thereby facilitating the swing assembly 530 to shift relative to the spindle 520. Additionally, the chainring installation structure 500 can further include an elastic element 560. The elastic element 560 is disposed on the spindle 520 at a position near the pawl portion 521, and the elastic element 560 has a plurality of elastic portions 561 extending radially. The elastic portions 561 are correspondingly abutted against the pawls 5212 so that the sliding elements 5214 and the ribs 5213 of the pawls 5212 can be retained in the guiding grooves 5311, thereby preventing the sliding elements 5214 and the ribs 5213 from detaching from the guiding grooves 5311.

In addition, since the sliding elements 5214 and the ribs 5213 of the pawls 5212 are respectively disposed in the guiding grooves 5311, the pawl portion 521 can also transmit power so that the spindle 520 can drive the first sleeve 531. When the spindle 520 rotates along the first rotational axis R1, the pawl portion 521 can also rotate along with the spindle 520 around the first rotational axis R1, and can drive the first sleeve 531 so that the first sleeve 531 can also rotate along with the spindle 520 along the first rotational axis R1. Thus, the spindle 520 can also make the swing assembly 530 to rotate about the first rotational axis R1.

Figure 6:
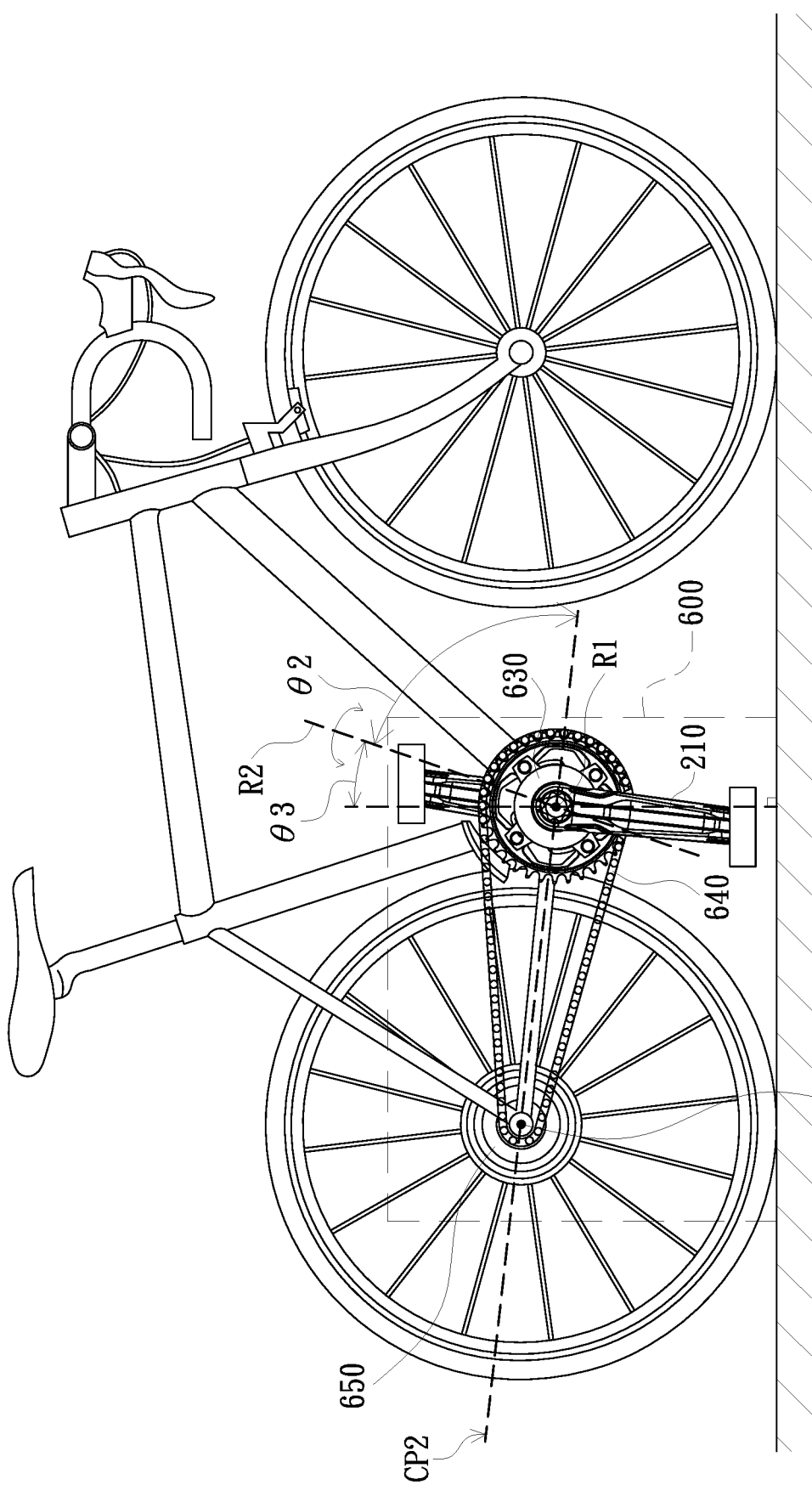
FIG. 6 is a side view of a bicycle equipped with a drivetrain system according to one embodiment of the present disclosure.

FIG. 6 is a side view of a bicycle equipped with a drivetrain system according to one embodiment of the present disclosure. Referring to FIG. 6, a drivetrain system 600 of the present embodiment can be mounted on a bicycle 60 and can include the chainring installation structure 200, 300, 400 or 500 disclosed above. Therefore, the drivetrain system 600 includes the crank 210, a spindle (covered by the crank 210 and not shown), and a swing assembly 630, wherein the spindle includes the first rotational axis R1, and the swing assembly 630 can be one of the above swing assemblies 230, 330, 430 and 530. Therefore, the swing assembly 630 includes a chainwheel (such as the chainring 240 in the above embodiment) and a second rotational axis R2, and can rotate about the second rotational axis R2, wherein the second rotational axis R2 crosses the first rotational axis R1.

The drivetrain system 600 further includes a freewheel 650 and a drivetrain element 640, wherein the drivetrain element 640 is engaged with the chainwheel and freewheel 650, and can be a chain or a belt, and the freewheel 650 includes a third rotational axis R3. When the crank 210 rotates along the first rotational axis R1, the chainwheel will rotate together with the crank 210 to drive the drivetrain element 640. The drivetrain element 640 driven by the chainwheel can transmit power to the freewheel 650 so that the freewheel 650 can rotate about the third rotational axis R3. Thus, a rearwheel of the bicycle 60 can be rotated to allow the bicycle 60 to move forward.

The first rotational axis R1 and the third rotational axis R3 are in a coplane CP2, and an included angle θ2, which can be an acute angle, is between the second rotational axis R2 and the coplane CP2, wherein the included angle θ2 can be greater than 30 degrees and less than 90 degrees. Therefore, the second rotational axis R2 is not perpendicular to the coplane CP2, and a rake angle θ3 can be formed as shown in FIG. 6. With the rake angle θ3, the swing assembly 630 can be stabilized so that the swing assembly 630 does not shift too often along the second rotational axis R2 relative to the spindle. In this way, the drivetrain element 640 can stably engage with the chainwheel and the freewheel 650, thereby reducing the risk of the drivetrain element 640 being disengaged from the chainwheel or the freewheel 650.

In summary, in the drivetrain system and the chainring installation structure of the present disclosure, the swing assembly connected to the chainring can be movably disposed on the spindle and is not in contact with the crank, wherein the swing assembly can rotate about the second rotational axis R2 and shift axially relative to the spindle. Thus, the swing assembly of the present disclosure can help reduce lateral stress, reduce the friction between both the freewheel and the chainring and the drivetrain element (e.g., a chain), thereby reducing the noise generated when riding the bicycle and the wear of the drivetrain element.

Secondly, the second rotational axis R2 crosses the first rotational axis R1 of the spindle, and the second rotational axis R2 is not perpendicular to the coplane CP2 formed by both the rotational axis (the first rotational axis R1) of the chainwheel and the rotational axis (the third rotational axis R3) of the freewheel, and therefore the second rotational axis can form the rake angle θ3, wherein the rake angle θ3 can stabilize the swing assembly, so that the swing assembly does not shift too frequently. In this way, the drivetrain element can stably engage with the chainwheel and the freewheel, thereby reducing the risk of the drivetrain element being disengaged from the chainwheel or the freewheel.

Note that the specification relating to the above embodiments should be construed as exemplary rather than as limitative of the present disclosure, with many variations and modifications being readily attainable by a person of average skill in the art without departing from the spirit or scope thereof as defined by the appended claims and their legal equivalents.

What is claimed is:
1. A chainring installation structure, comprising:
a crank;

a spindle comprising a first rotational axis, one end of the spindle being connected to the crank, the crank driving the spindle to cause the spindle to rotate about the first rotational axis; and a swing assembly disposed at one end of the spindle adjacent to the crank without contacting the crank, wherein the swing assembly shifts axially relative to the spindle and comprises a second rotational axis intersecting the first rotational axis;

wherein the swing assembly rotates about the second rotational axis;

wherein the first rotational axis lies in a plane, the plane is a horizontal plane, wherein an included angle is formed between the second rotational axis and the plane;

wherein the included angle is an acute angle;

wherein the included angle is greater than 30 degrees and less than 90 degrees.

2. The chainring installation structure as claimed in claim 1, wherein the swing assembly comprises a first sleeve, a second sleeve, and a third sleeve; a radial outer periphery of the first sleeve is connected to a radial inner periphery of the third sleeve, whereas a radial inner periphery of the first sleeve is disposed on the spindle radially; a radial outer periphery of the second sleeve is connected to a chainring, whereas a radial inner periphery of the second sleeve is connected to a radial outer periphery of the third sleeve; the third sleeve is concentrically disposed between the first sleeve and the second sleeve.

3. The chainring installation structure as claimed in claim 2, wherein the swing assembly comprises an intermediate element concentrically disposed between the first sleeve and the third sleeve to cause the first sleeve to rotate relative to the third sleeve.

4. The chainring installation structure as claimed in claim 3, wherein the intermediate element is a bearing.

5. The chainring installation structure as claimed in claim 2, wherein the third sleeve comprises two pivotal portions, the two pivotal portions are disposed on an outer periphery of the third sleeve under point symmetry, and the second rotational axis passes through the two pivotal portions to cause the swing assembly to rotate about the second rotational axis.

6. The chainring installation structure as claimed in claim 5, wherein the swing assembly comprises a fixing bracket, two axially extended connecting portions and at least one radially extended installation portion are disposed on an outer periphery of the fixing bracket, the two connecting portions are disposed on the two pivotal portions of the third sleeve, and the at least one installation portion is locked to a bicycle frame.

7. The chainring installation structure as claimed in claim 6, wherein the spindle has a flange portion facing an outer periphery of the crank and having a plurality of first guiding grooves; the inner periphery of the first sleeve has a plurality of second guiding grooves; wherein the swing assembly further comprises a sliding element mounted between the first guiding grooves and the second guiding grooves to cause the swing assembly to move axially relative to the spindle.

8. The chainring installation structure as claimed in claim 7, wherein the first guiding grooves and the second guiding grooves are parallel to the first rotational axis.

9. The chainring installation structure as claimed in claim 7, wherein the first guiding grooves and the second guiding grooves are not parallel to the first rotational axis.

10. The chainring installation structure as claimed in claim 7, wherein the sliding element comprises a plurality of balls, and the balls are correspondingly mounted between the first guiding grooves and the second guiding grooves.

11. The chainring installation structure as claimed in claim 6, wherein the spindle has a rib portion adjacent to the crank, the rib portion comprises a plurality of ribs radially arranged along the outer periphery of the spindle; the inner periphery of the first sleeve has a plurality of first guiding grooves, wherein the swing assembly further comprises a plurality of sliding elements correspondingly disposed in the ribs, and the ribs are correspondingly mounted in the first guiding grooves to cause the swing assembly to move axially relative to the spindle.

12. The chainring installation structure as claimed in claim 11, wherein the sliding element is a roller.

13. The chainring installation structure as claimed in claim 11, wherein the swing assembly further comprises a position limiting ring disposed between the first sleeve and the rib portion, and the position limiting ring fits the first sleeve and the rib portion to cause the swing assembly to move axially restrictively relative to the spindle.

14. The chainring installation structure as claimed in claim 13, wherein the position limiting ring comprises a plurality of second guiding grooves and a stop portion, the second guiding grooves are correspondingly disposed on the ribs, and the stop portion fits the first guiding grooves of the first sleeve.

15. The chainring installation structure as claimed in claim 6, wherein the spindle has a pawl portion facing the crank, the pawl portion comprises a plurality of bases and a plurality of pawls radially arranged along the outer periphery of the spindle, the pawls are correspondingly pivotally connected to the bases, and each of the pawls has a rib; the inner periphery of the first sleeve has a plurality of guiding grooves; wherein the pawl portion further comprises a plurality of sliding elements, the sliding elements are correspondingly mounted on the ribs, and the ribs are correspondingly mounted between the guiding grooves to cause the swing assembly to move axially relative to the spindle.

16. The chainring installation structure as claimed in claim 15, wherein each of the sliding elements is a roller.

17. The chainring installation structure as claimed in claim 16, wherein the chainring installation structure further comprises an elastic element disposed on the spindle at a position near the pawl portion, the elastic element has a plurality of elastic portions extending radially, and the elastic portions correspondingly abut against the pawls.

18. A drivetrain system, comprising:
a crank;
a spindle comprising a first rotational axis, one end of the spindle being connected to the crank, the crank driving the spindle to rotate about the first rotational axis;
a swing assembly disposed at one end of the spindle adjacent to the crank without contacting with the crank to cause the swing assembly to shift axially relative to the spindle, the swing assembly comprising a chainwheel and a second rotational axis intersecting the first rotational axis, the swing assembly rotating about the second rotational axis;
a freewheel comprising a third rotational axis; and
a drivetrain element engaged with the chainwheel and the freewheel, wherein the first rotational axis and the third rotational axis are in a coplane, and an included angle is formed between the second rotational axis and the coplane;
wherein the included angle is an acute angle;

wherein the included angle is greater than 30 degrees and less than 90 degrees.

* * * * *